Oct. 13, 1931.  G. G. ANDREWS  1,827,637
MACHINE FOR BUFFING AIRBAGS
Filed July 11, 1925   4 Sheets-Sheet 1

INVENTOR
George G. Andrews,
BY
ATTORNEY

Oct. 13, 1931.  G. G. ANDREWS  1,827,637
MACHINE FOR BUFFING AIRBAGS
Filed July 11, 1925    4 Sheets-Sheet 2
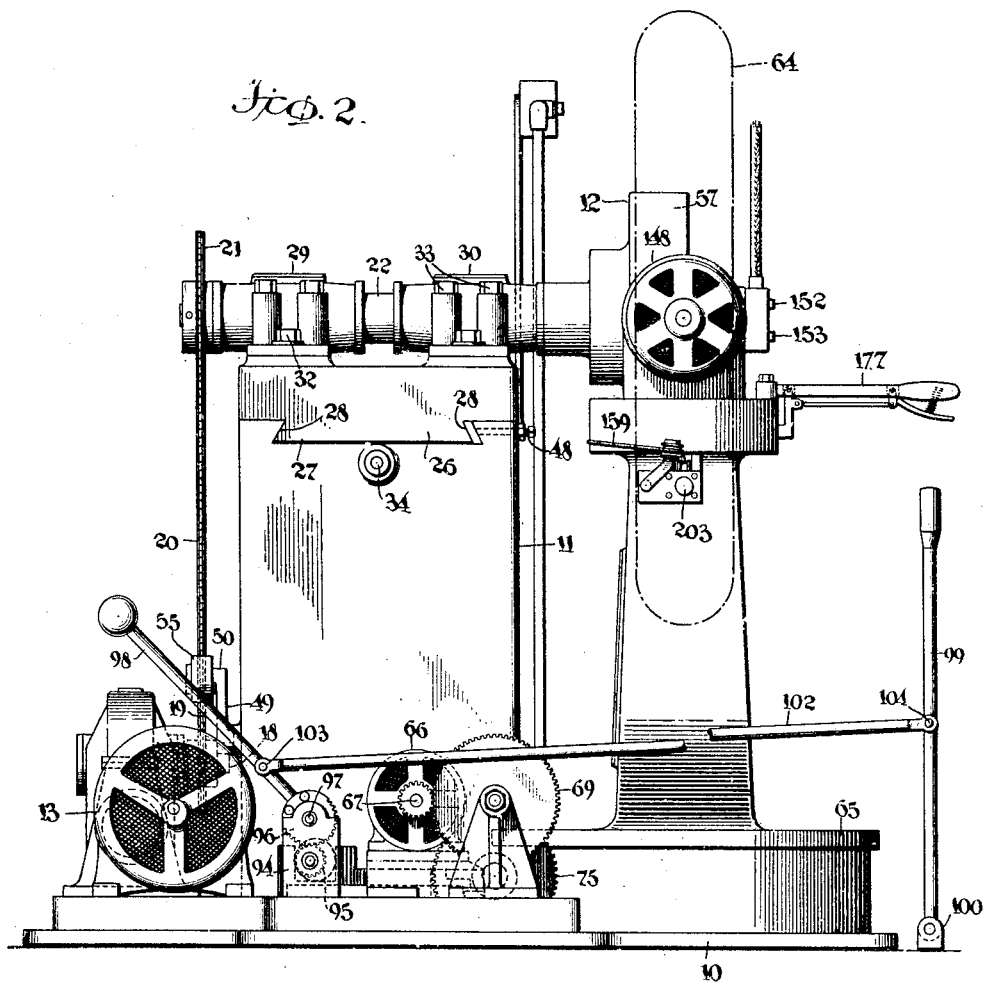
INVENTOR
George G. Andrews,
BY
ATTORNEY

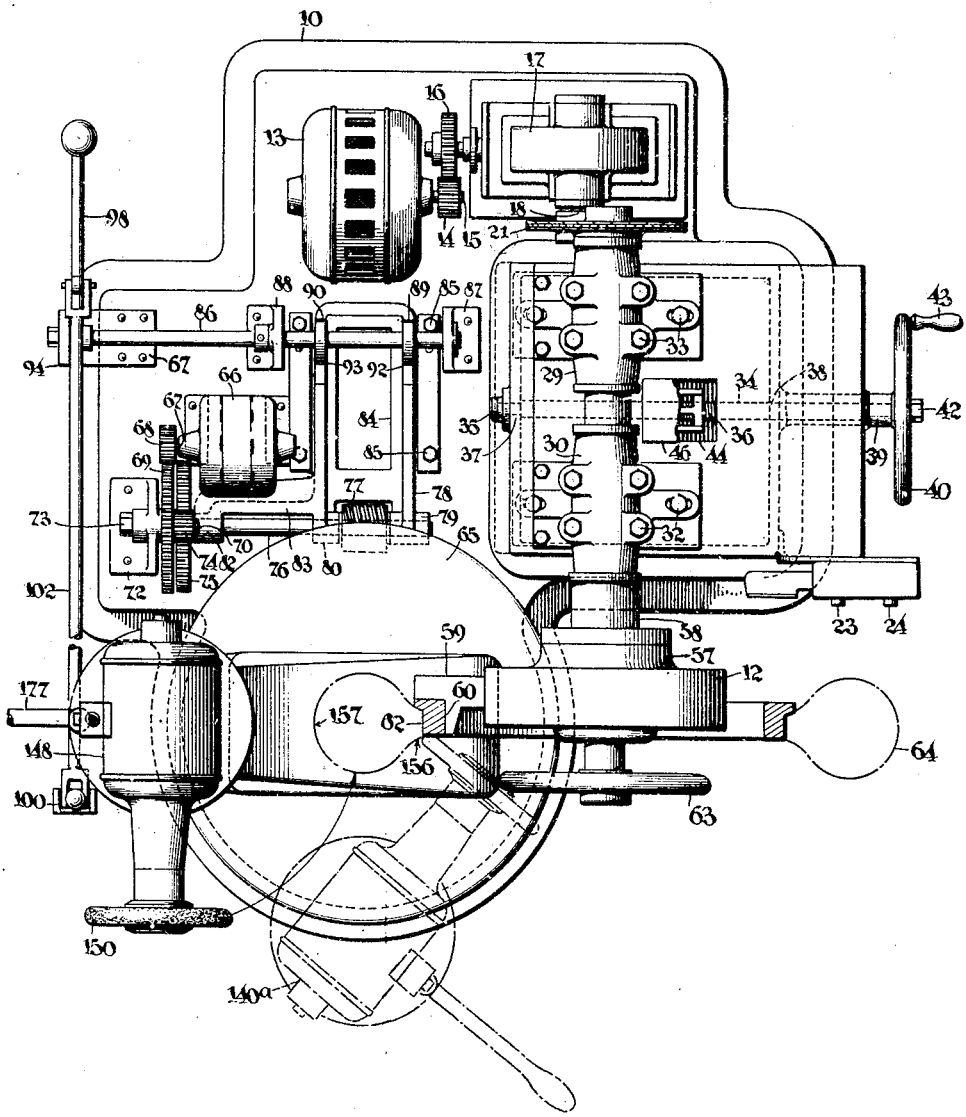

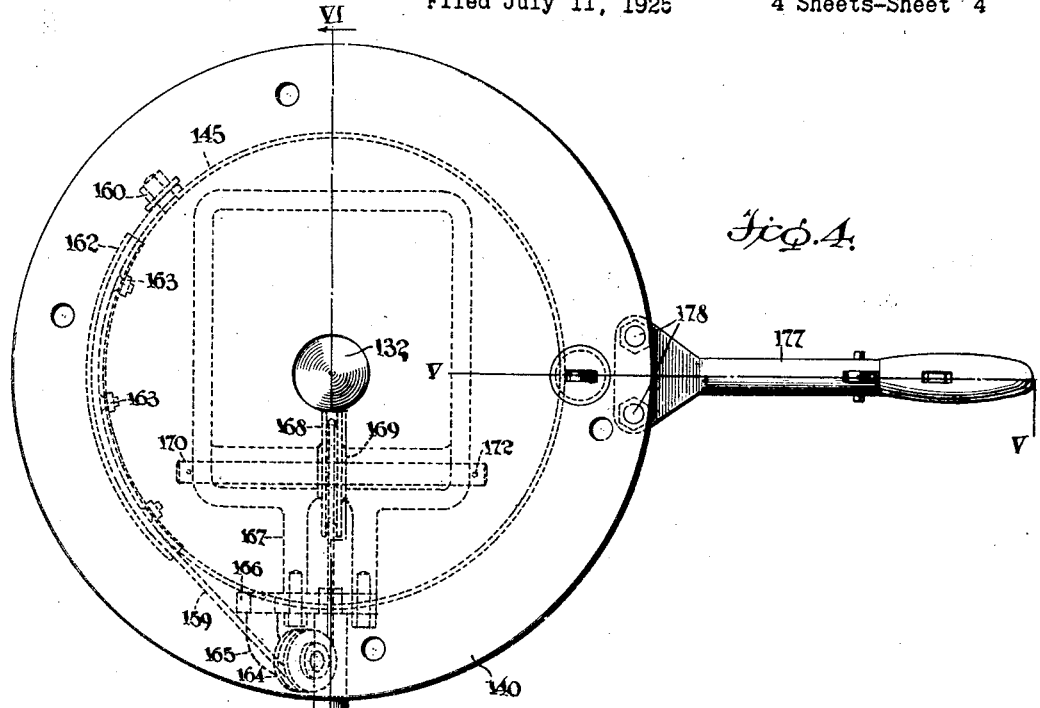
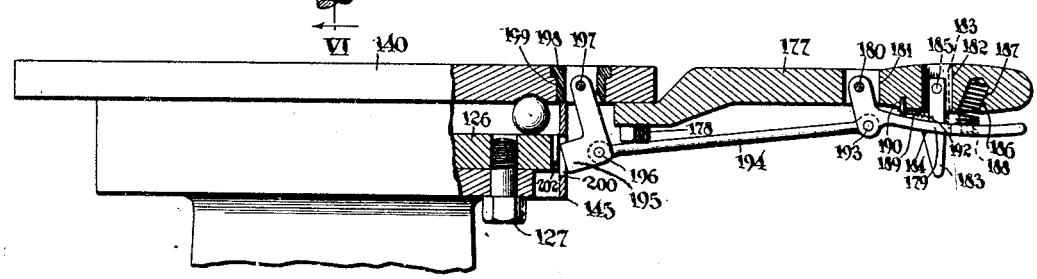
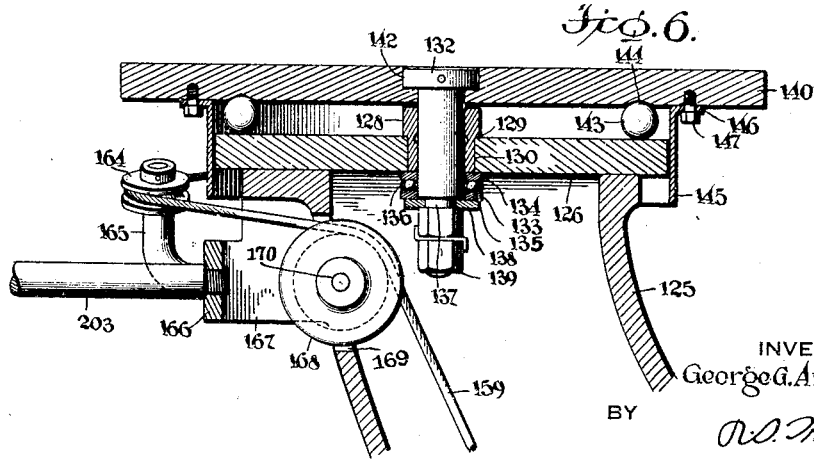

Patented Oct. 13, 1931

1,827,637

UNITED STATES PATENT OFFICE

GEORGE G. ANDREWS, OF AKRON, OHIO, ASSIGNOR TO THE GOODYEAR TIRE & RUBBER COMPANY, OF AKRON, OHIO, A CORPORATION OF OHIO

MACHINE FOR BUFFING AIRBAGS

Application filed July 11, 1925. Serial No. 43,017.

My invention relates to buffing apparatus and it has particular relation to a machine designed for the purpose of removing the outer surfaces of pneumatic cores as employed in the vulcanization of pneumatic automobile tires, preliminary to the repair thereof.

The primary object of my invention consists in providing a machine which is so designed that it is only necessary to set the buffing mechanism in a pre-determined position to properly engage a pneumatic core mounted on the machine, and thereafter to start the machine which operates automatically to progressively remove the outer surface of the airbag.

In the manufacture of automobile tires, pneumatic rubber cores, commonly called airbags, are used as cores and are inserted within the tire casing prior to the vulcanization thereof, and are maintained under a relatively high degree of pressure during the vulcanizing process. These airbags are subjected to severe handling in inserting them within and removing them from the tire casings. After a limited period of such usage, the air bags, being composed largely of rubber, absorb sulphur from the tire casings being vulcanized, causing the surfaces of the airbags to become over-cured and cracked. The bags must be repaired or replaced by new bags. As these bags are relatively expensive to manufacture, it is desirable to prolong their usefulness as much as possible. It has been found that by buffing away the hard brittle over-cured and cracked surfaces of the used airbags and vulcanizing thereon a new layer of rubber compound, the life of the airbags may be prolonged indefinitely.

Heretofore, the buffing operation has been accomplished primarily by manually guiding an emery wheel or other buffing member over the surface of the airbag, such wheel being mounted upon a driven flexible shaft or mounted upon a rotatable member adaped to swing the emery wheel attached thereto into contact with the airbag. In the operation of such apparatus, the undivided attention of the workman is required and he must skillfully guide the buffing wheel over the surface of the bag in order that it may be properly prepared for treatment. Under such conditions of operation, it is difficult to avoid irregularities in the buffed surface as the airbag may be buffed away more in one location than in another, according to the ablity of the workman.

It is the principal aim of my invention to obviate the disadvantages which were characteris ic of the old method of buffing airbags, by providing a machine whose operation is mechanical and automatic, and which requires no attention other than that its mechanism be set in operative position, whereupon the buffing operation is performed automatically.

In general, my machine consists of a driven rotatable airbag support whose axis is horizontally disposed, and a driven rotatable pedestal whose axis is vertically disposed and which is provided with a buffing member operated by a motor secured to a rotatable support at the top of the pedestal. The pedestal and airbag support are so arranged that the axis of rotation of the pedestal passes through substantially the center of the radial cross-sectional configuration of an airbag mounted on the airbag support, the cross-sectional configuration being determined by a horizontal plane passing through the axis of the airbag support. In order to provide for the proper positioning of the buffing member with respect to the airbag support, the pedestal is offset and the vertical axis of the buffing motor support carried thereon travels concentrically with respect to the axis of the pedestal. The motor shaft carries a buffing wheel which is adapted to be swung about the axis of the support toward the airbag support and is yieldingly maintained under pressure against the airbag by means of a weight mechanism secured to the motor support and suspended within the pedestal. Suitable motors are provided for rotating the airbag support and the pedestal, the speed of which may be regulated by means of conventional rheostats in case such regulation is desired.

For a better understanding of my invention, reference may now be had to the accompanying drawings forming a part of this specification, of which:

Fig. 2 is an elevational view of the machine illustrated in Fig. 1, the view being taken substantially at right angles to the view shown in Fig. 1;

Fig. 3 is a plan view of my machine illustrating the relationship between the several operating parts thereof;

Fig. 4 is a view on a larger scale illustrating, in detail, the motor support for a buffing member as employed in my machine;

Fig. 5 is a cross-sectional view of the mechanism shown in Fig. 4, the section being taken along the line V—V thereof; and Fig. 6 is a cross-sectional view on a larger scale illustrating in detail parts of the motor support for a buffing wheel employed in my invention, the view being taken substantially along the line VI—VI of Fig. 4.

Figure 1:
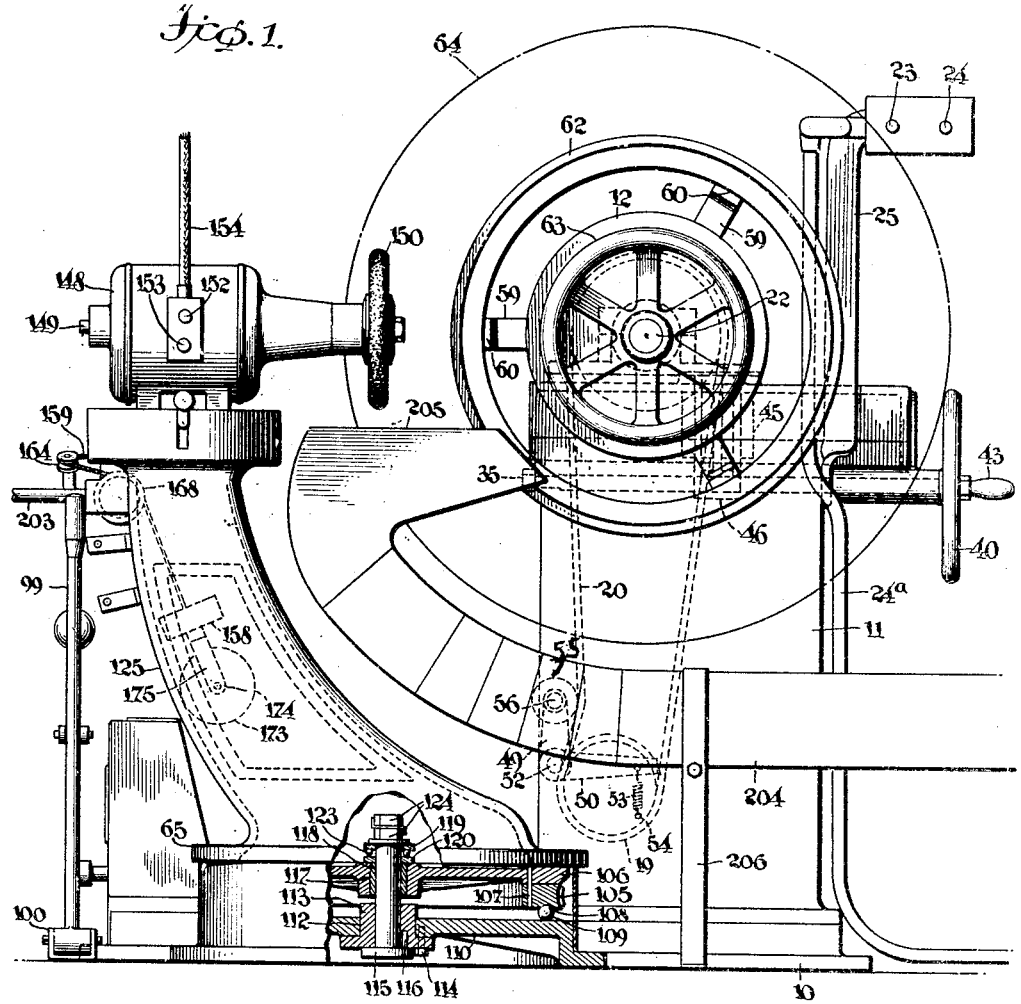
Fig. 1 is a view partially in elevation and partially in section of a machine embodying my invention, portions thereof being broken away for the sake of clearness.

In practising my invention, I have provided a base 10 in the form of a substantially flat metal bed plate provided with a stand 11 extending upwardly therefrom. A rotatable airbag support 12 is mounted adjacent the top of the stand and is driven by an electric motor 13 secured to the base 10 adjacent the stand 11. The motor is provided with a pinion 14, mounted upon a drive shaft 15, and intermeshes with a reducing gear member 16. As it is desired to rotate the airbag support at a relatively slow rate of speed, a conventional form of worm reduction gear, as indicated at 17, is provided in connection with the gear 16. At one side of the worm reduction gear 17, a shaft 18, forming a part thereof, is provided with a sprocket wheel 19 which drives through the medium of a sprocket chain 20, a second sprocket wheel 21 mounted rigidly upon one end of a shaft 22 forming a part of the rotatable airbag support.

The motor 13 is controlled by means of electrical switches 23 and 24 mounted upon a standard 25 secured to the side of the stand 11 and positioned conveniently for manipulation by the operator of the machine. An electric wire conduit 24ª provides communication between the buttons 23 and 24 and the motor 13.

A slidable carrier 26 for the shaft 22 is mounted on top of the stand 11 and is provided with a dove-tail portion 27 adapted to interfit with cooperating dove-tail elements 28 formed upon the top of the stand. Suitable bearing brackets 29 and 30 are bolted to the carrier as indicated at 32 and 33, and are adapted to receive the shaft 22 which rotates therein.

For a purpose later to be discussed, it is desirable to so adjust the carrier 26 that the position of the axis of the shaft 22 in a horizontal plane may be varied. In order to effect this adjustment a rod 34, provided at one end with a head 35 and a threaded intermediate portion 36, extends through the stand 11 and is journalled therein, as indicated at 37 and 38. A spacing sleeve 39 surrounds the rod adjacent one end thereof and bears against the side of the stand 11 and against a hand wheel 40, which is secured rigidly upon the end of the rod 34 and is held in place by means of a nut 42. The hand wheel 40 is adapted to be rotated by means of a handle 43 secured thereto. At the central portion of the carrier 26, there is formed an opening 44 having a flange 45 projecting downwardly and serving as a socket for a plug 46 fitted therein. The lower portion of the plug is provided with a threaded opening adapted to receive threaded portion 36 of the rod 34. It will be observed that the carrier is thus adapted to be moved horizontally by turning the handle 43 to rotate the threaded rod 34 within the threaded plug 46. In order to secure the carrier in any desired adjusted position, a threaded set screw 48, as best shown in Fig. 2, is disposed within a suitable opening extending through one side of the stand and is adapted to frictionally engage the dove-tail portion of the carrier 26.

As the shaft 22 is moved horizontally by adjustment of the carrier 26, the position of the sprocket wheel 21 is varied and thus, at different points of adjustment, the chain 20 will become loosened or tightened according to the direction of movement. In order to compensate for this variation in the distance between the sprocket wheels 19 and 21, I have provided a slack-compensating device 49 which consists of a bell-crank lever 50 pivoted at its elbow upon a stud 52 secured to the stand 11. One arm of the lever is provided with a coil spring 53 connected to a bolt 54 also secured to the stand. The other arm of the lever carries an idler pulley 55 adapted to engage the chain 20 and is journalled upon a pin 56 fixed to the end of the bell-crank lever 50. As the spring 53 exerts a constant force upon the lever 50, the idler pulley 55 is held in contact with the chain 20 and maintains it taut regardless of the position of the shaft 22.

One end of the shaft 22 extends beyond the edge of the stand and is provided with a chuck 57, spaced from the bearing bracket 30 by means of a collar or sleeve member 58, which is secured to the chuck. The chuck is of conventional form, similar to those employed in tire building machines, and is provided with adjustable arms 59 having shoulders 60 thereon for supporting a metal ring 62, of any desired size. The chuck 57 is provided with a hand wheel 63, which, when rotated, causes the arms 59 to move radially inwardly or outwardly in order to accommodate rings of different diameters. The ring 62 is adapted to support an airbag 64, which may be inflated, if desired, after the ring and airbag have been mounted upon the rotatable support.

Adjacent the stand 11 and below the airbag support 12, I have provided a rotatable pedestal 65 which is adapted to be driven by an electric motor 66 carried by the base 10. The motor is provided with a power shaft 67 carrying a pinion 68 which intermeshes with a relatively large gear wheel 69 rigidly supported upon the central portion of a stub shaft 70 journalled in a bearing bracket 72 secured to the base support. One end of the stub shaft 70 is provided with a head or nut 73 and the other end is provided with a fixedly mounted small gear wheel 74. A larger gear wheel 75, rigidly mounted upon one end of a shaft 76, engages the gear wheel 74 and is driven thereby. By reference to Fig. 3 it will be observed that the shaft 76 is provided with a worm gear 77 rigidly secured thereto, and is journalled upon a slide member 78 having three bearings 79, 80, and 82, the latter being formed in the end of an offset arm 83 abutting the gear wheel 75. The slide member operates within a guide 84 secured to the base member 10 by means of conventional bolts 85.

The slide member 78 is operated by a shaft 86 which is journalled adjacent one end thereof in brackets 87 and 88 on opposite sides of the slide member. Two eccentrics 89 and 90 are rigidly secured to the shaft 86 and fit respectively within two notches 92 and 93 formed in the slide member 78. Thus the slide member will be moved horizontally when the shaft 86 carrying the eccentrics 89 and 90 is rotated. The other end of the shaft 86 is secured in a bearing bracket 94 and is provided with a gear 95, as best shown in Fig. 2. A cooperating segmental gear 96 is mounted upon a stub shaft 97, also journalled in the bracket 94, which has rigidly mounted thereon a lever 98 which is adapted to be manually operated to rotate the shaft 86 and operate the slide 78. For the convenience of the operator, a second lever 99 is provided which is pivoted in a bracket 100 supported upon the floor or other suitable foundation. The levers 98 and 99 are spaced by means of a connecting rod 102 pivoted upon pins 103 and 104 in the respective levers.

By operating either of the levers 98 or 99, the worm gear 77 may be withdrawn from or engaged with a cooperating worm gear 105 secured to the rotatable pedestal 65. It will be noted by reference to Fig. 1 that the worm gear 105 is in the form of an annular member secured to a circular plate member 106 of the pedestal 65 by means of pins 107. This annular worm gear member 105 also serves the function of a ball race, being grooved, as indicated at 108, to receive ball bearings 109. A raised circular portion 110 of the base support provides a surface upon which the ball bearings 109 are supported from below. This raised circular portion is formed with a central opening 112 having a flanged collar 113 secured therein by means of bolts 114. The collar rigidly supports an upright pintle 115 secured against rotation therein by means of a key 116 extending through the head of the pintle and into the collar member. The plate member 106 of the pedestal is provided with a flanged opening 117 having a bushing 118 therein for receiving the pintle 115. If desirable, ball race members 119 and 120 may be positioned above the circular plate 106 and may be provided with ball bearings 123 positioned between the race members 119 and 120 and held in place upon the pintle 115 by means of nuts 124.

The pedestal 65 is formed with a hollow offset portion in the form of a leaning column 125 which is provided with a circular top plate 126 secured to the top of the column by means of bolts 127, as best shown in Figs. 5 and 6. At the center of the top plate, a bushing 128 having a shoulder 129 formed thereon is fitted into an opening 130 in the plate and supports a vertically disposed bolt 132 extending through the bushing. In order to reduce frictional resistance, ball race members 133 and 134 surround the bolt and have positioned therebetween ball or roller bearings 135 carried in a ball spacer 136. The lower portion of the bolt 132 is of reduced diameter, as indicated at 137, and a washer 138, fitted upon the reduced portion, abuts the ball race 133 and is held in place by means of nuts 139 secured upon the reduced portion of the bolt.

A circular motor supporting plate 140 is secured to the head of the bolt 132, indicated at 142, and is adapted to rotate therewith. Adjacent the periphery of the top plate member 140, ball bearings 143 are positioned between the top plate and the motor support and are guided in a groove 144 formed in the lower surface of the motor supporting plate. A shield 145, in the form of an annular depending metal member having a flange 146, is secured to the bottom of the motor supporting plate 140 by means of bolts 147.

A conventional electric motor 148 is mounted upon the supporting plate 140 and is provided with a shaft 149 carrying a buffing member 150, such as an emery wheel, which is adapted to swing about the axis of the motor support and in buffing contact with an airbag carried by the chuck 57. The operation of the motor is controlled by means of electrical push button switches 152 and 153 mounted on the motor 148 and which are connected to a suitable source of electrical current by a conductor 154.

As best illustrated in Figs. 1 and 3, it will be observed that the axis of the motor shaft 149 is in the same horizontal plane as the axis of the shaft 22 of the rotatable airbag support, and that the emery wheel 150 is adapted to engage the airbag 64 progressively from the bead portion, as indicated at 156, to the center of the tread portion, as indicated at 157. As best illustrated in Fig. 3, the center of the airbag section adjacent the emery wheel determined by a horizontal plane passing through the axis of the shaft 22 lies within the axis of rotation of the pedestal 65 and the axis of the motor support travels concentrically about the center of the airbag section referred to. In case a larger or smaller airbag is to be buffed, the center of the section thereof adjacent the buffing wheel and the axis of the pedestal are made to coincide by manipulating the hand wheel 40 to horizontally adjust the airbag support 12.

For the purpose of maintaining the emery wheel in intimate contact with the airbag during the buffing operation, it is desirable to provide means which will exert a rotative force upon the motor support 140 in one direction. In order to facilitate this operation, I have provided a weight mechanism, as best shown in Fig. 1, generally indicated by the numeral 158. A cable or cord 159, secured to the weight mechanism, is attached at its opposite end to the shield 145 by means of a bolt 160, as best shown in Fig. 4, and is trained about the shield in a flanged guide 162 secured to the periphery of the shield by means of screws 163. The cable extends over a pulley 164 journalled upon a bearing bracket 165 carried by a plate 166 the latter being bolted to lug 167 formed on the hollow column 125. A second pulley 168 is mounted in an opening 169 in the hollow column upon a bolt 170 extending through the sides of the column and secured in place by means of cotter pins 172. Owing to the fact that the column is hollow, it provides adequate space for weight members 173 suspended at the ends of the cable 159. One or more weight members may be employed and may be formed of circular configuration in order that they may be provided with an axial pin 174 which is adapted to be secured to the cable 159 by means of a shackle 175. Thus the weight is adapted to roll up or down along the sloping interior surface of the hollow column. Several weight members may be employed in order that one or more may be employed to vary the amount of rotative force exerted upon the motor support 140.

It will be apparent that the function of the weight mechanism is to rotate the motor support in one direction and thus swing the buffing wheel 150 into contact with the airbag and maintain it in engagement therewith at a uniform pressure as the pedestal rotates about the portion of the airbag in contact with the buffing wheel. The emery wheel is set to begin the buffing operation at the bead portion of the airbag and thereafter, the buffing operation is progressively and automatically performed over substantially one-half of the surface of the airbag, that is, until the emery wheel reaches the center of the tread portion of the airbag. At the completion of this operation the airbag is reversed and the operation repeated to treat the other side thereof.

While the buffing wheel 150 is not being operated, it is desirable to have it swung to one side in order to avoid interference with the operator while the airbag is being mounted on or removed from the chuck, and another is being placed thereon for treatment. Accordingly, I have provided an arm 177 rigidly secured to the motor support by means of bolts 178. The arm may be manually operated to rotate the motor support to any desired position. Adjacent the end of the arm, a lever 179 is pivoted upon a pin 180 secured in an opening 181 formed in the arm. The lever extends toward the free end of the arm substantially parallel therewith and is provided with a slot 182 adapted to receive the end of a latch member 183. One end of the latch member 183 is formed with a shoulder 184 adapted to engage the lever to maintain it in predetermined position with respect to the arm, while the other end thereof is pivoted by means of a pin 185 secured adjacent the end of the arm 177. A spring 186 positioned in a socket 187 of the arm is secured to a plug 188 carried by the lever and tends to spread apart the lever and arm. A second spring 189 is connected at one end to a pin 190 carried by the arm and at the other end to the pivoted latch member 183 as indicated at 192. At an intermediate point on the lever 179, a pivotal pin 193 is provided to which one end of a rod 194 is connected. The other end of the rod is connected to a latch member 195 by means of a pivotal pin 196. The upper end of the latch member 195 is provided with a pivot pin 197 secured in a sleeve member 198, the latter being secured in an opening 199 formed in the motor support. Adjacent the lower end of the latch 195, a slot 200 is formed in the shield 145, which slot is adapted to register with a notch 202 formed in the periphery of the top plate 126 of the hollow column. The end of the latch 195 is adapted to extend through the slot 200 and engage the notch 202 for the purpose of securing the motor support against rotation with respect to the top plate member 126. Thus it will be seen that by grasping the end of the arm 177, including the lever 179, the motor support may be swung about its axis. The shoulder 184 is adapted to be released by the fingers of the operator and the spring 186 will press the lever outwardly and cause the rod 194 to move the latch 195 into the notch 202 when the members are brought to the position where the slot 200 registers with the notch 202. Several notches identical with the one indicated at 202 may be provided in the periphery of the top plate member if it is desired to secure the motor support at different positions.

A second arm or handle 203 is secured adjacent the top of the hollow column 125. This arm is for the purpose of manually rotating the pedestal incident to the beginning of a buffing operation and to set the mechanism for operation prior to engagement of the worm gearing members 77 and 105. In order to carry away the ground or buffed particles from an air bag, I have provided a relatively large pipe 204 connected to a suitable suction producing apparatus, (not shown) and provided with a flared open end 205 positioned immediately below the emery wheel and partially inclosing the airbag. As it is common in the art to dispose of waste matter by means of suction apparatus, it is not deemed necessary to illustrate such apparatus in detail in this application. The suction pipe 204 is held in proper position by means of bracing members 206 adapted to be secured to the floor or other foundation.

The operation of my machine is as follows:

An airbag to be buffed is manually mounted upon the ring 62 of the rotatable support and if desired it may be slightly inflated in order to present a sufficiently firm surface for engagement with the buffing wheel. Horizontal adjustment of the airbag 64 is effected by turning the hand wheel 40 in order to bring the axis of the section of the airbag adjacent the buffing wheel 150, as determined by the horizontal plane passing through the axis of the shaft 22, into vertical alinement with the pedestal 65. The electrical push button switch 23 is then pressed to energize the motor 13, causing rotation of the airbag support.

The gearing members 77 and 105 being out of engagement, the operator grasps the arm 203 in order to swing the pedestal 65 about its axis until the motor support 140 is in the position indicated by the dot and dash lines 140ª, shown in Fig. 3. Likewise, the arm 177 is turned when the pedestal is in proper position to permit the emery wheel to engage the bead portion 156 of the airbag. The arm 177 is then released and the weight mechanism tending to rotate the motor support, maintains the buffing member in contact with the airbag.

In order to start rotation of the pedestal, either of the inter-connected levers 98 and 99 is moved to manipulate the slide 78, causing the worm gear 77 to engage the gear 105, which, upon energization of the motor 66, starts rotation of the pedestal in a clockwise direction as viewed in Fig. 3. It is to be understod that the motor 66 is adapted to run continuously. As soon as the buffing member is set, the motor 148 is energized by pressing the switch button 152. As the pedestal rotates in a clockwise direction, the buffing member 150 follows the contour of the airbag from the bead portion thereof toward the line defined by the greatest diameter thereof under uniform yielding pressure determined by the force exerted by the weight mechanism 158. It will be observed from this operation that the buffing wheel 150 follows the exact configuration of the airbag by riding uniformly over such irregularities of contour as may be present upon the surface thereof.

After the buffing wheel 150 has traveled from the bead portion 156 of the airbag to the central portion 157 thereof, the operator then presses the push button 153 to de-energize the motor 148, manipulates the levers 98 and 99 to disengage the pedestal driving gear members 77 and 105, and then swings the buffing wheel carried by the motor 158 out of contact with the airbag to the position shown in full lines of Fig. 3, at which position the motor support is locked with respect to the hollow column, by means of the latch 195. Likewise, the push button 24 is pressed to de-energize the motor 13 in order to stop rotation of the airbag support. After the machinery is stopped, the airbag is reversed upon the chuck ring 62 and the operation is repeated. Thus the entire exposed surface of the airbag is uniformly and efficiently removed.

From the above description, it will be seen that I have provided an airbag buffing machine whose operation is simple and efficient and which produces a uniformly buffed airbag with a minimum consumption of time and labor.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. In a machine of the character described, a substantially hollow driven rotatable pedestal provided with an opening adjacent its upper end, a relatively rotatable support carried upon the pedestal, a cable secured at one end to said support and freely extending through said opening into the pedestal and weight means carried on the portion of the cable within the pedestal, the arrangement being such that movement of the weight means is within the pedestal and tends constantly to rotate the support in one direction.

2. In a machine of the character described, a substantially hollow driven rotatable pedestal provided with an opening adjacent its upper end, a relatively rotatable support carried on the pedestal, a driven buffing member mounted upon the support, a cable secured at one end to said support and freely extending through said opening into the pedestal, pulleys operatively associated with said cable, weight means carried on the portion of the cable within the pedestal, the arrangement being such that movement of the weight means is within the pedestal and tends to yieldably urge the buffing member against an article to be buffed, and latch means for preventing relative rotation between the support and the pedestal.

3. In a machine of the character described, an airbag support, a driven rotatable pedestal, a relatively rotatable buffer support carried on the pedestal, a buffer carried on said latter support, means tending to yieldingly urge said buffer into engagement with the airbag, and latch means for preventing relative rotation between the buffer support and the pedestal, said latch means comprising a detent pivotally mounted on the buffer support and operatively engageable with the pedestal, an arm secured to the buffer support, and an operating member pivotally connected between said detent and said arm.

In witness whereof, I have hereunto signed my name.

GEORGE G. ANDREWS.